(12) United States Patent
Lu

(10) Patent No.: US 10,733,259 B2
(45) Date of Patent: Aug. 4, 2020

(54) WEB PAGE ACCESS METHOD AND APPARATUS

(71) Applicant: TENCENT TECHNOLOGY (SHENZHEN) COMPANY LIMITED, Shenzhen (CN)

(72) Inventor: Yaoyao Lu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 122 days.

(21) Appl. No.: 16/031,486

(22) Filed: Jul. 10, 2018

(65) Prior Publication Data

US 2018/0322215 A1 Nov. 8, 2018

Related U.S. Application Data

(63) Continuation of application No. PCT/CN2017/071952, filed on Jan. 20, 2017.

(30) Foreign Application Priority Data

Feb. 5, 2016 (CN) .......................... 2016 1 0081931

(51) Int. Cl.
*G06F 15/16* (2006.01)
*G06F 16/955* (2019.01)
(Continued)

(52) U.S. Cl.
CPC ........ *G06F 16/9566* (2019.01); *G06F 16/972* (2019.01); *H04L 67/02* (2013.01); *H04L 67/32* (2013.01)

(58) Field of Classification Search
USPC ........................................................ 709/217
See application file for complete search history.

(56) References Cited

U.S. PATENT DOCUMENTS

| 9,355,246 B1* | 5/2016 | Wan ..................... G06F 21/566 |
| 2009/0287658 A1* | 11/2009 | Bennett ................ G06F 16/951 |

(Continued)

FOREIGN PATENT DOCUMENTS

| CN | 102156709 A | 8/2011 |
| CN | 102385594 A | 3/2012 |

(Continued)

OTHER PUBLICATIONS

The World Intellectual Property Organization (WIPO) International Search Report for PCT/CN2017/071952 dated Apr. 26, 2017 5 Pages (including translation).

(Continued)

*Primary Examiner* — Anthony Mejia
(74) *Attorney, Agent, or Firm* — Anova Law Group, PLLC

(57) ABSTRACT

This application discloses a web page access method and apparatus. The web page access method includes: obtaining a web page access request, the web page access request carrying a web page address; determining whether a preset address sample set has an address sample matching the web page address; according to a determining result, loading a web page corresponding to the web page address by using a browser kernel; obtaining a web page element of the web page; determining whether a preset element sample set has a web page element sample matching the web page element; and when the preset element sample set has a web page element sample matching the web page element, determining whether browser kernel switching needs to be performed.

19 Claims, 4 Drawing Sheets

(51) Int. Cl.
*G06F 16/958* (2019.01)
*H04L 29/08* (2006.01)

(56) References Cited

U.S. PATENT DOCUMENTS

| | | | |
|---|---|---|---|
| 2011/0010612 A1* | 1/2011 | Thorpe | G06F 16/957 715/234 |
| 2011/0078558 A1* | 3/2011 | Bao | G06Q 30/02 715/234 |
| 2011/0138174 A1 | 6/2011 | Aciicmez et al. | |
| 2012/0271941 A1* | 10/2012 | Mirandette | G06F 16/955 709/224 |
| 2013/0339842 A1 | 12/2013 | Zhang et al. | |
| 2014/0149995 A1* | 5/2014 | Tian | G06F 9/54 719/313 |
| 2014/0258458 A1* | 9/2014 | He | G06F 16/957 709/217 |
| 2015/0081835 A1* | 3/2015 | Guan | H04L 67/2842 709/213 |
| 2015/0088984 A1* | 3/2015 | Liang | H04L 67/02 709/203 |
| 2015/0180973 A1* | 6/2015 | Yang | H04L 67/1095 709/203 |
| 2015/0277716 A1* | 10/2015 | Ramkumar | G06F 8/34 715/762 |
| 2016/0164946 A1* | 6/2016 | Bazzi | G06F 21/52 709/219 |
| 2016/0232252 A1* | 8/2016 | Cao | H04L 67/02 |
| 2016/0283606 A1* | 9/2016 | Xiong | G06F 40/103 |

FOREIGN PATENT DOCUMENTS

| | | |
|---|---|---|
| CN | 102890724 A | 1/2013 |
| CN | 103294717 A | 9/2013 |
| CN | 103631942 A | 3/2014 |
| CN | 104462571 A | 3/2015 |

OTHER PUBLICATIONS

The State Intellectual Property Office of the People's Republic of China (SIPO) Office Action 1 for 201610081931.8 dated Jun. 27, 2019 8 Pages (including translation).

The State Intellectual Property Office of the People's Republic of China (SIPO) Office Action 2 for 201610081931.8 dated Dec. 17, 2019 8 Pages (including translation).

* cited by examiner

WEB PAGE ACCESS METHOD AND APPARATUS

RELATED APPLICATIONS

This application is a continuation application of PCT Patent Application No. PCT/CN2017/071952, filed on Jan. 20, 2017, which claims priority to Chinese Patent Application No. 201610081931.8, entitled "WEB PAGE ACCESS METHOD AND APPARATUS" filed on Feb. 5, 2016, which is incorporated by reference in its entirety.

FIELD OF THE TECHNOLOGY

This application relates to the field of computer technologies and, specifically, to a web page access method and apparatus.

BACKGROUND OF THE DISCLOSURE

With the development of the information society, the web browser becomes a main tool with which a user communicates with the Internet, and the user may browse a web page by using the browser, so as to perform learning, entertainment, and the like.

A browser kernel is a core part of a browser, and is responsible for interpreting web page syntax and rendering a web page. Therefore, the browser kernel determines how the browser displays content of the web page and format information of the page. Currently, relatively common browser kernels include a Trident kernel used by the IE browser (generally also referred to as an IE kernel), a Gecko kernel used by the Firefox browser, a Webkit kernel used by the Safari browser, and the Chrome browser, and a Presto kernel used by the Opera browser.

Because different browser kernels interpret web page syntax differently, a rendering (display) effect of a same web page in browsers with the different kernels may also be different. As there are relatively many mainstream browser kernels currently, when developing a website, a web page developer likely compiles codes for only one browser kernel. This may cause web page compatibility problems such as disordered display of the web page and function failure under another kernel browser.

To make web page compatibility of a browser stronger, for a browser developer, the simplest and most effective way is to integrate a plurality of kernels. That is, to improve the web page compatibility of a browser, the current solution is to provide a multi-kernel browser, so that the browser can open web pages supporting different browser kernels. Specifically, the multi-kernel browser provides an entry point to a kernel that can switched by a user manually and, when the user accesses a particular web page, the user can select a kernel that is more appropriate to open the particular web page to be accessed.

However, in such kernel switching solution, the user needs to perform kernel the switching and selection operations, and a large majority of users do not understand meanings of kernel selection and kernel related knowledge. Therefore, the browser cannot use an appropriate kernel to open the web page that currently needs to be accessed, reducing web page compatibility of the multi-kernel browser.

SUMMARY

Embodiments of the present disclosure provide a web page access method and apparatus, so as to improve web page compatibility of a multi-kernel browser.

An embodiment of the present disclosure provides a web page access method. The method is implemented by a terminal and includes: obtaining a web page access request, the web page access request carrying a web page address; determining whether a preset address sample set has an address sample matching the web page address; according to a determining result, loading a web page corresponding to the web page address by using a browser kernel; obtaining a web page element of the web page; determining whether a preset element sample set has a web page element sample matching the web page element; and when the preset element sample set has a web page element sample matching the web page element, determining whether browser kernel switching needs to be performed.

Correspondingly, an embodiment of the present disclosure further provides a non-transitory computer-readable storage medium. The non-transitory computer-readable storage medium contains computer-executable instructions for, when executed by one or more processors, performing a web page access method for a multi-kernel browser. The method includes: obtaining a web page access request, the web page access request carrying a web page address; determining whether a preset address sample set has an address sample matching the web page address; according to a determining result, loading a web page corresponding to the web page address by using a browser kernel; obtaining a web page element of the web page; determining whether a preset element sample set has a web page element sample matching the web page element; and when the preset element sample set has a web page element sample matching the web page element, determining whether browser kernel switching needs to be performed.

Correspondingly, an embodiment of the present disclosure further provides a web page access device. The web page access device includes a memory, the memory storing program instructions; and one or more processors coupled to the memory. When executing the program instructions, the processor is configured for: obtaining a web page access request, the web page access request carrying a web page address; determining whether a preset address sample set has an address sample matching the web page address; according to a determining result, loading a web page corresponding to the web page address by using a browser kernel; obtaining a web page element of the web page; determining whether a preset element sample set has a web page element sample matching the web page element; and when the preset element sample set has a web page element sample matching the web page element, determining whether browser kernel switching needs to be performed.

According to the embodiments of the present disclosure, a web page access request is received, the web page access request carrying a web page address, then whether a preset address sample set has an address sample matching the web page address is determined, and a web page corresponding to the web page address is loaded by using a browser kernel and according to a determining result. According to the solution, an appropriate browser kernel may be automatically selected for a user to open a web page that currently needs to be accessed, so as to prevent the user from selecting an inappropriate browser kernel to open the web page that currently needs to be accessed, and improve web page compatibility of a multi-kernel browser.

BRIEF DESCRIPTION OF THE DRAWINGS

To describe the technical solutions in the embodiments of the present disclosure more clearly, the following briefly introduces the accompanying drawings used for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

The following describes the technical solutions in the embodiments of the present disclosure with reference to the accompanying drawings. Apparently, the described embodiments are merely some but not all the embodiments of the present disclosure. Other embodiments obtained by a person skilled in the art based on the embodiments of the present disclosure without creative efforts shall fall within the protection scope of the present disclosure.

An embodiment of the present disclosure provides a web page access method, including: receiving a web page access request, the web page access request carrying a web page address; then determining whether a preset address sample set has an address sample matching the web page address; and loading, according to the determining result, a web page corresponding to the web page address by using a browser kernel. The web page access method of this embodiment may be implemented in computer terminals or other devices for performing web page access.

Figure 1:
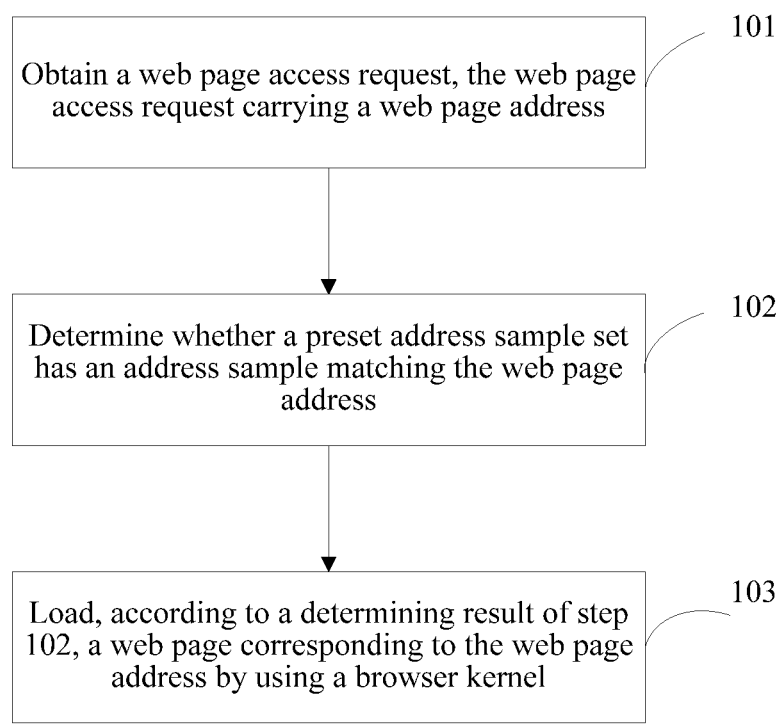
FIG. 1 illustrates a flowchart of a web page access method according to an embodiment of the present disclosure.

As shown in FIG. 1, specifically, a process of the web page access method may include the following.

101. Obtaining a web page access request, where the web page access request carries a web page address. That is, the web page access request carrying the web page address (i.e., a web page address of a to-be-accessed web page) is obtained.

For example, a web page access request triggered by a user through a terminal is received, and the web page access request carries a web page address of a to-be-accessed web page. The web page address may be a uniform resource locator (URL).

The web page access request triggered by the user through the terminal is received in a plurality of ways. For example, an interface may be set on a browser display interface. In this way, the web page access request may be triggered subsequently by using the interface. That is, the step of "receiving the web page access request triggered by the user by using the terminal" includes: displaying a web page interface using a browser, the web page interface including a web page access interface; and receiving a corresponding web page access request triggered by the user through the web page access interface.

The web page access interface may be represented in a plurality of forms, for example, an icon form or an input box form, and the number of web page access interfaces may be set according to an actual application requirement. Details are not described herein.

102. Determining whether a preset address sample set includes an address sample matching the web page address.

The preset address sample set may include at least one web page address, which may be referred in short as an address sample. Further, each address sample may correspond to one of a plurality of browser kernels in the browser, and the plurality of browser kernels may be configured according to an actual application requirement. For example, the preset address sample set includes a plurality of URLs, and each URL may correspond to one browser kernel. Specifically, for example, URL1 corresponds to a browser kernel 1, URL2 corresponds to a browser kernel 2, . . . , and URLn corresponds to a browser kernel n.

A preset address sample may also be set according to an actual application requirement. For example, a web page address that the user usually accesses is selected as an address sample, or all web page addresses accessed by the user in a preset period of time are used as address samples.

Specifically, the step of "determining whether a preset address sample set has an address sample matching the web page address" may include: performing one-to-one matching between the web page address and address samples in the preset address sample set, and if an address sample matches the web page address successfully, determining that the preset address sample set has an address sample matching the web page address.

103. Loading a web page corresponding to the web page address by using a browser kernel selected according to a determining result of step 102.

For example, if the result of step 102 is yes, i.e., a matching address sample is determined, a web page corresponding to the web page address is loaded by using a browser kernel corresponding to the matching address sample. If the result of step 102 is no, the process ends. Optionally, in this case, the user is prompted to load a web page by manually selecting a browser kernel or by using a default browser kernel.

Specifically, a corresponding browser kernel may be obtained by using a mapping relationship set, and then a corresponding web page is loaded by using the selected browser kernel. The mapping relationship set may include a mapping relationship (that is, a correspondence) between an address sample and a browser kernel, for example, a mapping relationship between an address sample a and the browser kernel 1, a mapping relationship between an address sample b and the browser kernel 2, and the like. That is, the step of "loading a web page corresponding to the web page address by using a browser kernel corresponding to the matching address sample" may specifically include: obtaining a browser kernel corresponding to the matching address sample based on the mapping relationship set, the mapping relationship set including a mapping relationship between an address sample and a browser kernel; and loading a web page corresponding to the web page address by using the browser kernel corresponding to the matching address sample.

For example, a corresponding mapping relationship is searched for in the mapping relationship set according to a matching address sample, and then a browser kernel corresponding to the matching address sample is obtained based on the mapping relationship.

The mapping relationship set may be a preset mapping relationship set and, in preset address samples in the set, a mapping relationship (that is, a correspondence) between an address sample and a browser kernel may by preset by a system or may be set by the user. In this way, a browser kernel corresponding to a matching address sample may be obtained subsequently based on the mapping relationship. That is, before the step of "obtaining a web page access request", the web page access method further includes: receiving a mapping relationship setting request, the mapping relationship setting request indicating an address sample and a browser kernel between which a mapping relationship needs to be established; and establishing a mapping relationship between an address sample and a browser kernel according to the mapping relationship setting request, so as to establish a mapping relationship set.

Moreover, in one embodiment, a mapping relationship between an address sample and a browser kernel may be alternatively established by a server. In this case, the mapping relationship may be obtained from the server. That is, before the step of "obtaining a web page access request", the web page access method further includes: sending a mapping relationship request to a server, and receiving and storing a mapping relationship set returned by the server according to the mapping relationship request. In this case, the step of "loading a web page corresponding to the web page address by using a browser kernel corresponding to the matching address sample" may specifically include: obtaining a browser kernel corresponding to the matching address sample based on the mapping relationship set; and loading a web page corresponding to the web page address by using the browser kernel corresponding to the matching address sample.

In one embodiment, a mapping relationship set may include a mapping relationship between at least one web page address and a browser kernel, and the mapping relationship set may be presented in a form of a table that is referred to as a mapping relationship table. In this case, the mapping relationship table may include a preset address sample and a preset browser kernel corresponding to the preset address sample.

In one embodiment, the loading a web page corresponding to the web page address by using a browser kernel may specifically include: performing web page rendering on web page content corresponding to the web page address by using the browser kernel, so as to present the web page content.

For example, when a user accesses a web page by using a multi-kernel browser, the browser receives a web page access request, the web page access request carrying a URL that needs to be accessed, and then the browser determines whether a stored preset URL sample set has a URL sample matching the URL. If yes, a browser kernel corresponding to the matching URL sample is obtained based on the mapping relationship set, and then web page rendering is performed on web page content corresponding to the URL by using the browser kernel.

Optionally, to be capable of selecting a more appropriate browser kernel to open a web page and further improving web page compatibility and user experience, after a web page is loaded, the method may include obtaining a web page element of the loaded web page and selecting an appropriate browser kernel according to the web page element to load the web page. That is, after the step of "loading a web page corresponding to the web page address by using a browser kernel corresponding to the matching address sample", the web page access method may further include: obtaining a web page element of the web page; determining whether a preset element sample set has a web page element sample matching the web page element; and if yes, determining whether browser kernel switching needs to be performed.

When browser kernel switching is performed, the web page may be loaded by using a browser kernel corresponding to the matching web page element sample.

The preset element sample set may include at least one web page element that is referred to as web page element sample, and each web page element sample may correspond to one browser kernel. For example, the preset element sample set includes a plurality of web page elements, and each web page element may correspond to one browser kernel. Specifically, for example, a web page element 'a' corresponds to a browser kernel 1, a web page element 'b' corresponds to a browser kernel 2, and so on. Moreover, a preset element sample may also be set according to an actual application requirement. For example, a web page element of a web page that the user usually accesses is selected as a preset web page element sample, or web page elements of all web pages accessed by the user in a preset period of time are used as preset element samples.

There is a preset mapping relationship between each web page element sample and a browser kernel. Therefore, after a matching web page element sample is determined, a browser kernel corresponding to the matching web page element sample may be determined based on the mapping relationship, and then switching is performed to load a web page by using the determined browser kernel.

A web page element of a web page may be obtained in a plurality of ways. For example, web page element detection may be performed on a web page, so as to obtain a web page element. The detection of a web page element may include at least one of doctype (document type label) detection, label detection, j s (script language) execution error detection, j s function detection, element content detection, and the like.

In one embodiment, whether browser kernel switching needs to be performed is determined in a plurality of ways. For example, whether a browser kernel corresponding to a matching web page element sample is the same as a currently used browser kernel is determined, and if yes, it is determined that the switching does not need to be performed, or if no, it is determined that the switching needs to be performed. During actual application, one web page element sample may correspond to a plurality of browser kernels. Therefore, a matching web page element sample may correspond to a plurality of browser kernels. In this case, one appropriate browser kernel may be selected from the plurality of browser kernels, and then whether the selected browser kernel is the same as the currently used browser kernel is determined, and if yes, it is determined that the switching does not need to be performed, or if no, it is determined that the switching needs to be performed.

That is, the step of "determining whether browser kernel switching needs to be performed" may specifically include: obtaining a plurality of browser kernels corresponding to the matching web page element sample; selecting a target browser kernel from the plurality of browser kernels; determining whether the target browser kernel is the same as a currently used browser kernel; and if no, determining that browser kernel switching needs to be performed; or if yes, determining that browser kernel switching does not need to be performed. The step of performing browser kernel switching may specifically include: performing switching to load the web page by using the target browser kernel.

In one embodiment, a target browser kernel is selected from a plurality of browser kernels in a plurality of ways. For example, a priority level of each browser kernel can be set in advance. In this way, a target browser kernel may be selected subsequently according to priority levels of the browser kernels. That is, the step of "selecting a target browser kernel from the plurality of browser kernels" may specifically include: selecting a target browser kernel from the plurality of browser kernels according to priority levels respectively corresponding to the plurality of browser kernels. For example, a browser kernel at a highest priority level is selected as a target browser kernel.

The foregoing describes a process of selecting a browser kernel to open a web page in a case in which a preset address sample set has an address sample matching a web page address. In one embodiment, to be capable of opening a web page by using an appropriate browser kernel when a preset address sample set has no address sample matching a web page address, optionally, a web page may be opened by using a preset browser kernel (that is, default browser kernel), and then the used browser kernel is adjusted according to a web page element, so that a web page is opened by using a most appropriate browser kernel, so as to further improve web page compatibility of a browser.

That is, the web page access method may further include: loading, when it is determined that the preset address sample set has no address sample matching the web page address, the web page corresponding to the web page address by using a preset browser kernel; obtaining a web page element of the loaded web page; determining whether a preset element sample set has a web page element sample matching the web page element; and if yes, determining whether browser kernel switching needs to be performed.

Optionally, the web page access method may further include: performing browser kernel switching if browser kernel switching needs to be performed, for example, loading the web page by using a browser kernel corresponding to the matching web page element sample.

For descriptions about the preset element sample set, the determining whether browser kernel switching needs to be performed, and the like, reference may be made to the previous related description, and details are not repeated herein.

To improve comprehensiveness of a preset address sample, and then improve accuracy of selecting a browser kernel and web page compatibility, after the step of "performing browser kernel switching", the method of one embodiment may further include: establishing, when the preset address sample set has no address sample matching the web page address, a mapping relationship between the web page address and the currently used browser kernel; and adding the mapping relationship between the web page address and the currently used browser kernel to the mapping relationship set, and adding the web page address as an address sample to the preset address sample set.

In this way, the web page access may continuously update and perfect the preset address sample and the mapping relationship set, so that an appropriate browser kernel may be selected for various access addresses, so as to further improve web page compatibility of a multi-kernel browser.

Thus, according to the disclosed embodiments of the present disclosure, a web page access request is received, the web page access request carrying a web page address, then whether a preset address sample set has an address sample matching the web page address is determined, and a web page corresponding to the web page address is loaded by using a browser kernel and according to a determining result. Thus, an appropriate browser kernel may be automatically selected for a user to open a web page that currently needs to be accessed, so as to prevent the user from selecting an inappropriate browser kernel to open the web page that currently needs to be accessed, alleviate a problem of compatibility between a browser and a web page, and improve web page compatibility of a multi-kernel browser.

Further, after a web page corresponding to the web page address is loaded by using a browser kernel corresponding to the matching address sample, a web page element of the web page is obtained; whether a preset element sample set has a web page element sample matching the web page element is determined; and if yes, whether browser kernel switching needs to be performed is determined, and if yes, switching is performed to load the web page by using a browser kernel corresponding to the matching web page element sample. Further, a browser kernel is adjusted or switched according to a web page element, so that a web page is accessed or opened by using a most appropriate browser kernel, so as to further improve web page compatibility of a multi-kernel browser, and improve user experience.

Figure 2:
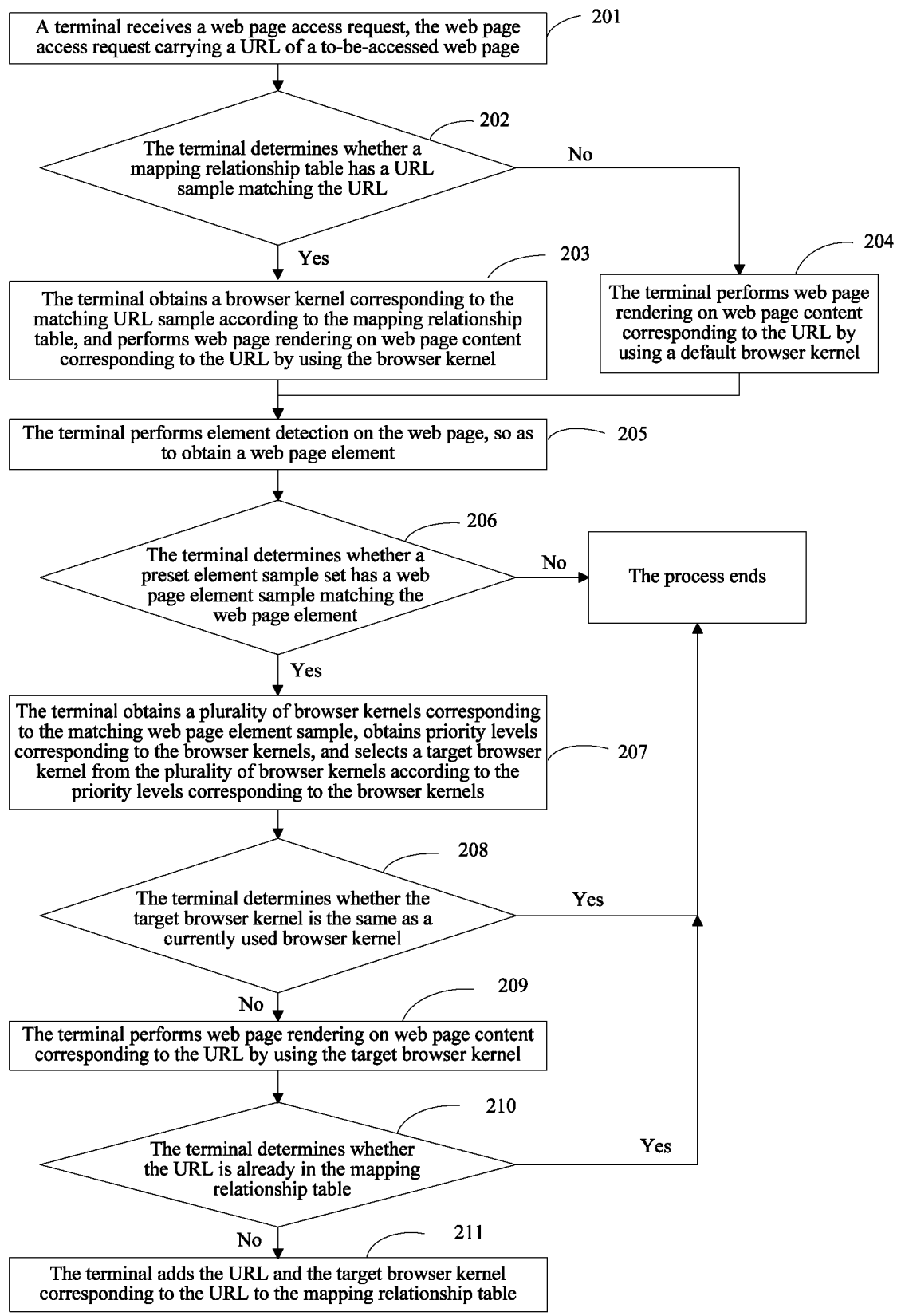
FIG. 2 illustrates a flowchart of a web page access method according to another embodiment of the present disclosure.

According to the method described previously, the following further provides a detailed descriptions example in which a web page address is a URL. As shown in FIG. 2, specifically, a process of the web page access method may include the followings.

201. A terminal receives a web page access request, the web page access request carrying a URL of a to-be-accessed web page.

For example, a browser on the terminal obtains a web page access request by using a web page access interface, the access request carrying a URL associated with the web page access interface.

202. The terminal determines whether a mapping relationship table has a URL sample matching the URL in the access request; and if yes, step 203 is performed, or if no, step 204 is performed.

The mapping relationship table may be a table of a correspondence between a URL sample and a browser kernel, and includes a URL sample and a browser kernel corresponding to the URL sample. Optionally, a URL sample may exist in the mapping relationship table in a plurality of ways, for example, in a wildcard character manner.

203. The terminal obtains a browser kernel corresponding to the matching URL sample according to the mapping relationship table, and performs web page rendering on web page content corresponding to the URL by using the browser kernel; and the process goes to step 205.

Specifically, the browser on the terminal may search for a corresponding browser kernel in the mapping relationship table according to the matching URL sample, then obtain web page content of the URL, and perform rendering on the web page content by using the browser kernel.

204. The terminal performs web page rendering on web page content corresponding to the URL by using a default browser kernel; and the process goes to step 205.

For example, the terminal performs web page rendering on web page content corresponding to the URL by using a default Chrome kernel.

205. The terminal performs web page element detection on the web page, so as to obtain a web page element. The element detection may include: at least one of doctype detection, label detection, js execution error detection, js function detection, element content detection, and the like, and a specific detection manner may be set according to an actual requirement.

206. The terminal determines whether a preset element sample set has a web page element sample matching the web page element; and if yes, perform step 207, or if no, the process completes.

The preset element sample set may include at least one web page element that is referred to as web page element sample, each web page element may correspond to at least one browser kernel, and specifically, a corresponding browser kernel may be set according to an actual requirement.

If the preset element sample set has no matching web page element, it may be considered that a kernel currently used by the user is a kernel most compatible with a page, and switching does not need to be performed.

207. The terminal obtains a plurality of browser kernels corresponding to the matching web page element sample, obtains priority levels corresponding to the browser kernels, and selects a target browser kernel from the plurality of browser kernels according to the priority levels corresponding to the browser kernels.

For example, a priority level of a browser kernel corresponding to each web page element sample may be preset, and a priority level of a browser kernel may be set according to a rendering effect.

208. The terminal determines whether the target browser kernel is the same as a currently used browser kernel; and if no, perform step 209, or if yes, the process ends.

For example, the browser of the terminal may determine whether the target browser kernel is the same as the currently used browser kernel; if yes, it indicates that the kernel does not need to be switched, or if no, it indicates that the currently used kernel is not most appropriate, and therefore the kernel needs to be switched.

209. The terminal performs web page rendering on web page content corresponding to the URL by using the target browser kernel.

210. The terminal determines whether the URL is already in the mapping relationship table; and if no, perform step 211, or if yes, the process completes.

211. The terminal adds the URL and the target browser kernel corresponding to the URL to the mapping relationship table.

To continuously improve the mapping relationship table and improve accuracy of selecting a browser kernel, and web page compatibility, in one embodiment, when the URL does not exist in the mapping relationship table, the mapping relationship table may be updated according to the URL and the target browser kernel corresponding to the URL.

Thus, according to disclosed embodiments of the present disclosure, a terminal receives a web page access request, the web page access request carrying a web page address of a to-be-accessed web page; then the terminal determines whether a mapping relationship table has a URL sample matching a URL; if yes, the terminal obtains a browser kernel corresponding to the matching URL sample according to the mapping relationship table, and performs web page rendering on web page content corresponding to the URL by using the browser kernel; or if no, the terminal performs web page rendering on the web page content corresponding to the URL by using a default browser kernel. Thus, an appropriate browser kernel may be automatically selected for a user to open a web page that currently needs to be accessed, so as to prevent the user from selecting an inappropriate browser kernel to open the web page that currently needs to be accessed, alleviate a problem of compatibility between a browser and a web page, and improve web page compatibility of a multi-kernel browser.

Further, after web page rendering is performed, the terminal performs element detection on the web page, so as to obtain a web page element; then the terminal determines whether a preset element sample set has a web page element sample matching the web page element; if yes, the terminal obtains a plurality of browser kernels corresponding to the matching web page element sample, obtains priority levels corresponding to the browser kernels, and selects a target browser kernel from the plurality of browser kernels according to the priority levels corresponding to the browser kernels, and the terminal determines whether the target browser kernel is the same as a currently used browser kernel; and if no, the terminal performs web page rendering on web page content corresponding to the URL by using the target browser kernel, the terminal performs web page rendering on web page content corresponding to the URL by using the target browser kernel, and the terminal adds the URL and the target browser kernel corresponding to the URL to the mapping relationship table. Further, a browser kernel is adjusted or switched based on a web page element, so that a web page is opened by using a most appropriate browser kernel, so as to improve web page display quality, and further improve web page compatibility of a multi-kernel browser and user experience. Additionally, the mapping relationship table is updated dynamically, so as to increase a range of covering a URL by the mapping relationship table, and an appropriate kernel may be selected for more URLs, so as to improve the web page compatibility of the multi-kernel browser again.

Corresponding to the disclosed methods, an embodiment of the present disclosure further provides a web page access apparatus. The web page access apparatus may be specifically integrated in a terminal and the web page access apparatus may be integrated in a terminal in a plurality of ways. For example, the web page access apparatus may be installed in a terminal in a terminal application form, or may be directly disposed in a terminal in a hardware form. A specific form may be determined according to an actual application requirement, and details are not described herein.

Figure 3A:
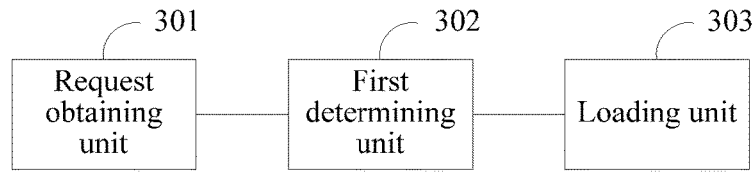
FIG. 3A illustrates a schematic structural diagram of a web page access apparatus according to an embodiment of the present disclosure.

As shown in FIG. 3A, the web page access apparatus may include a request obtaining unit 301, a first determining unit 302, and a loading unit 303. The request obtaining unit 301 is configured to obtain a web page access request, the web page access request carrying a web page address. For example, a web page access request triggered by a user by using a terminal is received, the web page access request carrying a web page address of a to-be-accessed web page.

The web page access request triggered by the user by using the terminal is received in a plurality of ways. For example, an interface may be set on a browser display interface. In this way, the web page access request may be triggered subsequently by using the interface. That is, the step of "receiving the web page access request triggered by the user by using the terminal" includes: displaying a web page interface by using a browser, the web page interface including a web page access interface; and receiving a corresponding web page access request triggered by the user by using the web page access interface.

The first determining unit 302 is configured to determine whether a preset address sample set has an address sample matching the web page address.

The preset address sample set may include at least one web page address briefly referred to as address sample, each address sample may correspond to one browser kernel, and these browser kernels may be set according to an actual application requirement.

The loading unit 303 is configured to load, according to a determining result of the first determining unit 302, a web page corresponding to the web page address by using a browser kernel.

When the first determining unit 302 determines that the preset address sample set has an address sample matching the web page address, the loading unit 303 loads a web page corresponding to the web page address by using a browser kernel corresponding to the matching address sample.

For example, the loading unit 303 may: obtain a browser kernel corresponding to the matching address sample based on the mapping relationship set, the mapping relationship set including a mapping relationship between an address sample and a browser kernel; and load the web page corresponding to the web page address by using the obtained browser kernel.

Figure 3B:
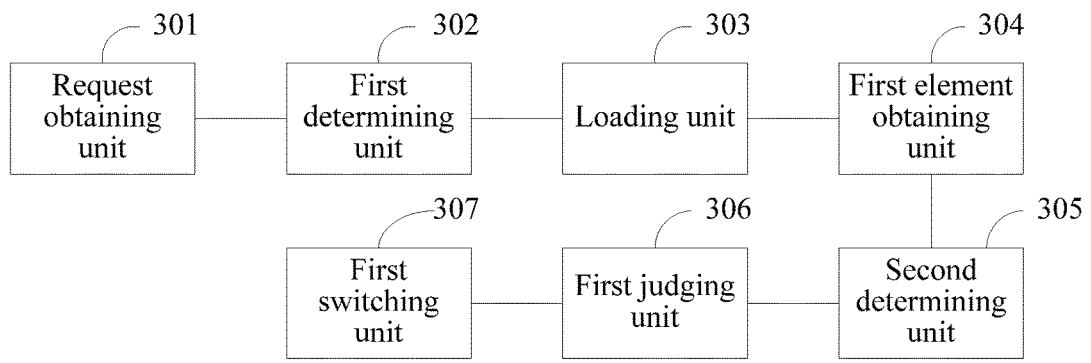
FIG. 3B illustrates a schematic structural diagram of a web page access apparatus according to another embodiment of the present disclosure.

Optionally, to make the terminal open a web page by using a most appropriate browser kernel, referring to FIG. 3B, the web page access apparatus may further include: a first element obtaining unit 304, a second determining unit 305, a first judging unit 306, and a first switching unit 307.

The first element obtaining unit 304 is configured to obtain a web page element of the web page; the second determining unit 305 is configured to determine whether a preset element sample set has a web page element sample matching the web page element; the first judging unit 306 is configured to determine, when the second determining unit determines that the preset element sample set has a web page element sample matching the web page element, whether browser kernel switching needs to be performed; and the first switching unit 307 is configured to perform, when the first judging unit 306 determines that browser kernel switching needs to be performed, browser kernel switching, that is, load the web page by using a browser kernel corresponding to the matching web page element sample.

The web page access apparatus may further include a kernel obtaining unit and a selection unit. The kernel obtaining unit is configured to obtain a plurality of browser kernels corresponding to the matching web page element sample; and the selection unit is configured to select a target browser kernel from the plurality of browser kernels.

The judging unit is further configured to determine whether the target browser kernel is the same as a currently used browser kernel; and if no, determine that browser kernel switching needs to be performed, or if yes, determine that browser kernel switching does not need to be performed.

For example, the selection unit is specifically configured to select a target browser kernel from the plurality of browser kernels according to priority levels respectively corresponding to the plurality of browser kernels.

Figure 3C:
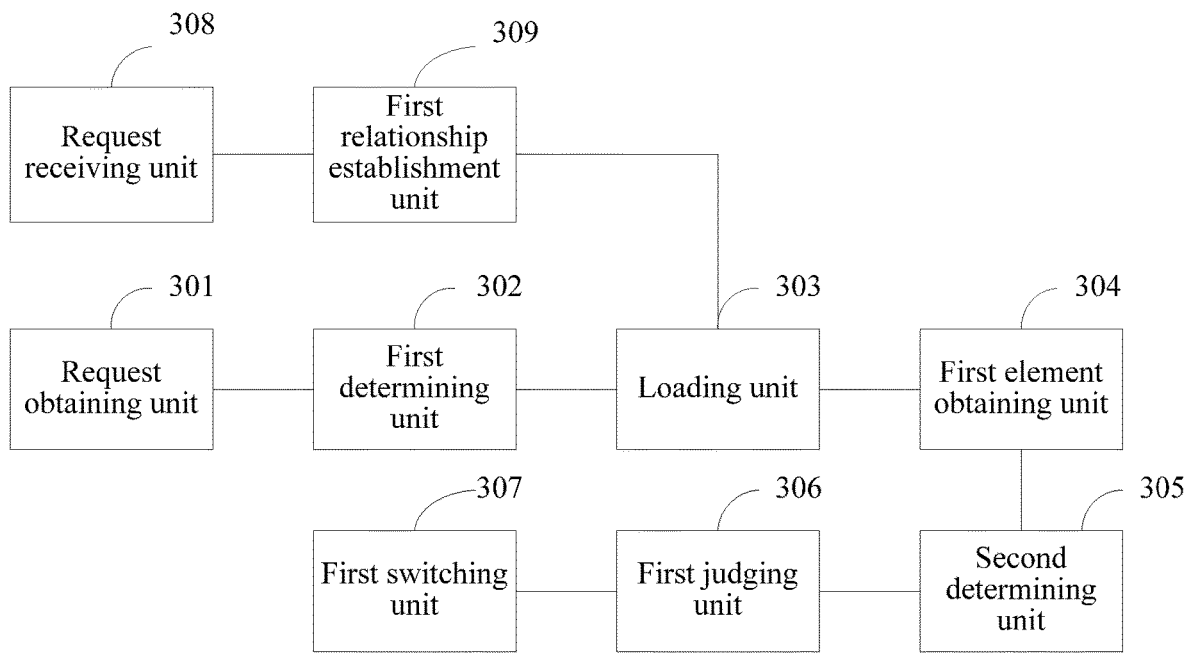
FIG. 3C illustrates a schematic structural diagram of a web page access apparatus according to another embodiment of the present disclosure.

Optionally, based on the apparatus shown in FIG. 3B, referring to FIG. 3C, the apparatus may further include a request receiving unit 308 and a first relationship establishment unit 309.

The request receiving unit 308 is configured to receive, before the request obtaining unit 301 obtains the web page access request, a mapping relationship setting request, the mapping relationship setting request indicating an address sample and a browser kernel between which a mapping relationship needs to be established. The first relationship establishment unit 309 is configured to establish a mapping relationship between an address sample and a browser kernel according to the mapping relationship setting request, so as to obtain a mapping relationship set.

Optionally, to further improve web page compatibility of a multi-kernel browser, based on the apparatus shown in FIG. 3C, the apparatus may further include: a second element obtaining unit, a third determining unit, a second judging unit, and a second switching unit.

The loading unit is further configured to load, when the first determining unit determines that the preset address sample set has no address sample matching the web page address, the web page corresponding to the web page address by using a preset browser kernel. The second element obtaining unit is configured to obtain a web page element of the web page.

The third determining unit is configured to determine whether a preset element sample set has a web page element sample matching the web page element. The second judging unit is configured to determine, when the third determining unit determines that the preset element sample set has a web page element sample matching the web page element, whether browser kernel switching needs to be performed.

Further, the second switching unit is configured to perform, when the second judging unit determines that browser kernel switching needs to be performed, switching to load the web page by using a browser kernel corresponding to the matching web page element sample.

Optionally, to be capable of updating the mapping relationship dynamically, and further improving the web page compatibility, the apparatus may further include a second relationship establishment unit and an addition unit.

The loading unit is further configured to obtain a browser kernel corresponding to the matching address sample based on the mapping relationship set, the mapping relationship set including a mapping relationship between an address sample and a browser kernel; and load the web page corresponding to the web page address by using the obtained browser kernel.

The second relationship establishment unit is configured to establish, after switching is performed to load the web page by using the browser kernel corresponding to the matching web page element sample and when the preset address sample set has no address sample matching the web page address, a mapping relationship between the web page address and the currently used browser kernel.

The addition unit is configured to add the mapping relationship between the web page address and the currently used browser kernel to the mapping relationship set, and add the web page address as an address sample to the preset address sample set.

In a specific implementation, the foregoing units may be implemented as independent entities, or may be combined, or may be implemented as a same entity or several entities. For specific implementations of the foregoing units, refer to the foregoing method embodiments, details of which are not repeated herein.

The web page access apparatus may be integrated in a terminal, for example, installed in a terminal in a client or another software form, and the terminal may specifically include a device such as a mobile phone, a tablet computer, a notebook computer, or a personal computer (PC).

Thus, according to the disclosed web page access apparatus, the request obtaining unit 301 obtains a web page access request, the web page access request carrying a web page address, then the first determining unit 302 determines whether a preset address sample set has an address sample matching the web page address, and the loading unit 303 loads, according to a determining result of the first determining unit 302, a web page corresponding to the web page address by using a browser kernel. Thus, an appropriate browser kernel may be automatically selected for a user to open a web page that currently needs to be accessed, so as to prevent the user from selecting an inappropriate browser kernel to open the web page that currently needs to be accessed, alleviate a problem of compatibility between a browser and a web page, and improve web page compatibility of a multi-kernel browser.

Further, after a web page corresponding to the web page address is loaded by using a browser kernel corresponding to the matching address sample, the first element obtaining unit 304 obtains a web page element of the web page; then the second determining unit 305 determines whether a preset element sample set has a web page element sample matching the web page element; and if yes, the first judging unit 306 determines whether browser kernel switching needs to be performed, and if yes, the first switching unit 307 performs switching to load the web page by using a browser kernel corresponding to the matching web page element sample. Further, a browser kernel is adjusted or switched according to a web page element, so that a web page is accessed or opened by using a most appropriate browser kernel, so as to further improve web page compatibility of a multi-kernel browser, and improve user experience.

Figure 4:
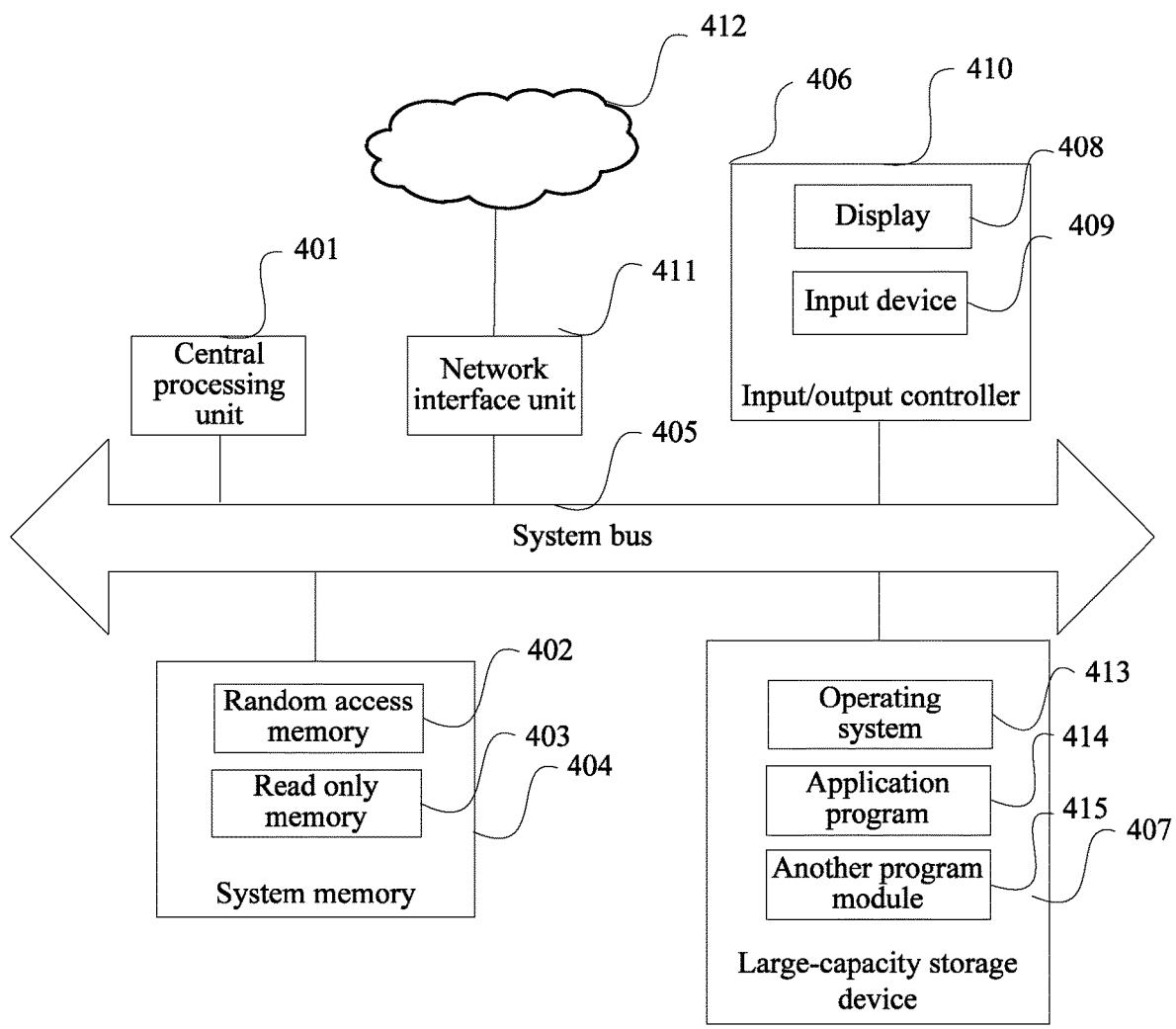
FIG. 4 illustrates a schematic structural diagram of an electronic device according to an embodiment of the present disclosure.

FIG. 4 shows an electronic device according to an embodiment of the present disclosure that may be configured to implement the disclosed web page access methods. Referring to FIG. 4, the electronic device includes a processor (CPU) 401, a system memory 404 including a random-access memory (RAM) 402 and a read only memory (ROM) 403, and a system bus 405 connecting the system memory 404 and the processor 401.

The electronic device further includes a basic input/output system (I/O system) 406 assisting in transmitting information between devices in a computer, and a large-capacity storage device 407 configured to store an operating system 413, an application program 414 and another program module 415.

The basic I/O system 406 includes a display 408 configured to display information and an input device 409, such as a mouse or a keyboard, configured to input information for a user. The display 408 and the input device 409 are both connected to the processor 401 by using an input and output controller 410 connected to the system bus 405. The basic I/O system 406 may further include the input and output controller 410 to be configured to receive and process inputs from multiple other devices such as a keyboard, a mouse, and an electronic stylus. Similarly, the input and output controller 410 further provides an output to a display screen, a printer or another type of output device.

The large-capacity storage device 407 is connected to the processor 401 by using a large-capacity storage controller (not shown) connected to the system bus 405. The large-capacity storage device 407 and its associated computer readable medium provide non-volatile storage for a client device. That is to say, the large-capacity storage device 407 may include the computer readable medium (not shown) such as a hard disk or a CD-ROM driver.

Without loss of generality, the computer readable medium may include a computer storage medium and a communications medium. The computer storage medium includes volatile and non-volatile media, and removable and non-removable media implemented by using any method or technology used for storing information such as a computer readable instruction, a data structure, a program module or other data. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. Certainly, persons skilled in art can know that the computer storage medium is not limited to the foregoing several types. The system memory 404 and the large-capacity storage device 407 may be collectively referred to as a memory.

According to various embodiments of the present disclosure, the electronic device may further be connected, by using a network such as the Internet, to a remote computer on the network and run. That is, the electronic device may be connected to a network 412 by using a network interface unit 411 connected to the system bus 405, or may also be connected to another type of network or remote computer system (not shown) by using the network interface unit 411.

The memory further includes one or more software modules, and the one or more software modules are stored in the memory and are configured to be executed by one or more processors 401, so as to implement the method according to any one of the foregoing embodiments.

Optionally, the one or more modules have the following functions: obtaining a web page access request, the web page access request carrying a web page address of a to-be-accessed web page; determining whether a preset address sample set has an address sample matching the web page address; and if yes, loading a web page corresponding to the web page address by using the browser kernel corresponding to the matching address sample.

Optionally, the one or more modules further have the following functions: after the loading a web page corresponding to the web page address by using the browser kernel corresponding to the matching address sample, obtaining a web page element of the web page; determining whether a preset element sample set has a web page element sample matching the web page element; and if yes, determining whether browser kernel switching needs to be performed.

Optionally, the one or more modules further have the following function: loading, if browser kernel switching needs to be performed, the web page by using a browser kernel corresponding to the matching web page element sample.

The step of determining whether browser kernel switching needs to be performed specifically includes: obtaining a plurality of browser kernels corresponding to the matching web page element sample; selecting a target browser kernel from the plurality of browser kernels; determining whether the target browser kernel is the same as a currently used browser kernel; and if no, determining that browser kernel switching needs to be performed; or if yes, determining that browser kernel switching does not need to be performed. In this case, the step of performing switching to load the web page by using a browser kernel corresponding to the matching web page element sample specifically includes: performing switching to load the web page by using the target browser kernel.

Optionally, the step of "selecting a target browser kernel from the plurality of browser kernels" may specifically include: selecting a target browser kernel from the plurality of browser kernels according to priority levels respectively corresponding to the plurality of browser kernels.

Optionally, the step of "loading a web page corresponding to the web page address by using a browser kernel corresponding to the matching address sample" specifically includes: obtaining a browser kernel corresponding to the matching address sample based on the mapping relationship set, the mapping relationship set including a mapping relationship between an address sample and a browser kernel; and loading the web page corresponding to the web page address by using the obtained browser kernel.

Optionally, the one or more modules further have the following functions: before the web page access request is obtained, receiving a mapping relationship setting request, the mapping relationship setting request indicating an address sample and a browser kernel between which a mapping relationship needs to be established; and establishing a mapping relationship between an address sample and a browser kernel according to the mapping relationship setting request, so as to obtain a mapping relationship set.

Optionally, the one or more modules further have the following functions: loading, when it is determined that the preset address sample set has no address sample matching the web page address, the web page corresponding to the web page address by using a preset browser kernel; obtaining a web page element of the web page; determining whether a preset element sample set has a web page element sample matching the web page element; and if yes, determining whether browser kernel switching needs to be performed.

Optionally, the one or more modules further have the following function: loading, if browser kernel switching needs to be performed, the web page by using a browser kernel corresponding to the matching web page element sample.

Optionally, the step of "loading a web page corresponding to the web page address by using a browser kernel corresponding to the matching address sample" specifically includes: obtaining a browser kernel corresponding to the matching address sample based on the mapping relationship set, the mapping relationship set including a mapping relationship between an address sample and a browser kernel; and loading the web page corresponding to the web page address by using the obtained browser kernel.

In this case, the one or more modules further have the following functions: establishing, after switching is performed to load the web page by using the browser kernel corresponding to the matching web page element sample and when the preset address sample set has no address sample matching the web page address, a mapping relationship between the web page address and the currently used browser kernel; and adding the mapping relationship between the web page address and the currently used browser kernel to the mapping relationship set, and adding the web page address as an address sample to the preset address sample set.

It should be noted that, for the web page access method of the present disclosure, a person of ordinary skill in the art may understand that all or some procedures of the web page access method may be implemented by using a computer program by controlling related hardware. The computer program may be stored in a computer readable storage medium, for example, stored in a memory of a terminal, and be executed by at least one processor in the terminal. When the computer program is running, the procedures of the web page access method in the embodiments are performed. The foregoing storage medium may include: a magnetic disk, an optical disc, a read-only memory (ROM), or a random-access memory (RAM).

The modules of the web page access apparatus in the embodiments of the present disclosure may be integrated into one processing chip, or each of the modules may exist alone physically, or two or more modules are integrated into one module. The integrated module may be implemented in a form of hardware, or may be implemented in a form of a software functional module. When the integrated module is implemented in the form of a software functional module and sold or used as an independent product, the integrated unit may be stored in a computer readable storage medium. The storage medium is, for example, an ROM, a magnetic disk, or an optical disc.

The web page access method and apparatus provided in the embodiments of the present disclosure are described above in detail. Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A web page access method for a multi-kernel browser, comprising:
    obtaining, by a terminal, a web page access request, the web page access request carrying a web page address;
    determining, by the terminal, whether a preset address sample set has an address sample matching the web page address, each address sample in the preset address sample set corresponding to one of multiple browser kernels;
    according to a determining result, loading, by the terminal, a web page corresponding to the web page address by using a first browser kernel, including:
        upon determining that the preset address sample set has an address sample matching the web page address, using a browser kernel corresponding to the matching address sample as the first browser kernel; and
        upon determining that the preset address sample set does not include an address sample matching the web page address, using a default browser kernel as the first browser kernel;
    detecting, by the terminal, a web page element of the web page;
    determining, by the terminal, whether a preset element sample set has a web page element sample matching the web page element, each preset element sample set corresponding to one or more browser kernels of the multiple browser kernels; and
    when the preset element sample set has a web page element sample matching the web page element, determining, by the terminal, whether browser kernel switching needs to be performed based on whether a target browser kernel corresponding to the matching webpage element is the same as the first browser kernel.

2. The web page access method according to claim 1, further comprising:
    when it is determined that browser kernel switching needs to be performed, re-loading, by the terminal, the web page by using the target browser kernel corresponding to the matching web page element sample.

3. The web page access method according to claim 1, further comprising:
    obtaining, by the terminal, a plurality of browser kernels corresponding to the matching web page element sample; and selecting, by the terminal, the target browser kernel from the plurality of browser kernels for determining whether browser kernel switching needs to be performed.

4. The web page access method according to claim 3, further comprising:
when it is determined that the target browser kernel is not same as the browser kernel, determining, by the terminal, that browser kernel switching needs to be performed,
wherein the performing browser kernel switching includes: re-loading, by the terminal, the web page by using the target browser kernel.

5. The web page access method according to claim 3, further comprising:
selecting, by the terminal, the target browser kernel from the plurality of browser kernels according to priority levels of the plurality of browser kernels.

6. The web page access method according to claim 1, further comprising:
establishing, by the terminal, a mapping relationship between the web page address and the browser kernel corresponding to the matching web page element sample; and
adding, by the terminal, the web page address as an address sample to the preset address sample set.

7. The web page access method according to claim 3, further comprising:
selecting, by the terminal, a browser kernel at a highest priority level among the plurality of browser kernels corresponding to the matching web page element sample as the target browser kernel.

8. The web page access method according to claim 1, wherein the multiple browser kernels include at least two of: a Trident kernel, a Gecko kernel, a Webkit kernel, or a Presto kernel.

9. The web page access method according to claim 1, wherein detecting the web page element of the web page includes at least one of: doctype detection, label detection, js execution error detection, js function detection, or element content detection.

10. A non-transitory computer-readable storage medium containing computer-executable instructions for, when executed by one or more processors, performing a web page access method for a multi-kernel browser method on a terminal, the method comprising:
obtaining a web page access request, the web page access request carrying a web page address;
determining whether a preset address sample set has an address sample matching the web page address, each address sample in the preset address sample set corresponding to one of multiple browser kernels;
according to a determining result, loading a web page corresponding to the web page address by using a first browser kernel, including:
upon determining that the preset address sample set has an address sample matching the web page address, using a browser kernel corresponding to the matching address sample as the first browser kernel; and
upon determining that the preset address sample set does not include an address sample matching the web page address, using a default browser kernel as the first browser kernel;
detecting a web page element of the web page;
determining whether a preset element sample set has a web page element sample matching the web page element, each preset element sample set corresponding to one or more browser kernels of the multiple browser kernels; and
when the preset element sample set has a web page element sample matching the web page element, determining whether browser kernel switching needs to be performed based on whether a target browser kernel corresponding to the matching webpage element is the same as the first browser kernel.

11. The non-transitory computer-readable storage medium according to claim 10, the method further comprising:
when it is determined that browser kernel switching needs to be performed, re-loading the web page by using the target browser kernel corresponding to the matching web page element sample.

12. The non-transitory computer-readable storage medium according to claim 10, the method further comprising:
obtaining a plurality of browser kernels corresponding to the matching web page element sample; and
selecting the target browser kernel from the plurality of browser kernels for determining whether browser kernel switching needs to be performed.

13. The non-transitory computer-readable storage medium according to claim 12, wherein the determining whether browser kernel switching needs to be performed comprises:
when it is determined that the target browser kernel is not same as the browser kernel, determining that browser kernel switching needs to be performed,
wherein the performing browser kernel switching includes: re-loading the web page by using the target browser kernel.

14. The non-transitory computer-readable storage medium according to claim 12, wherein the selecting a target browser kernel from the plurality of browser kernels comprises:
selecting the target browser kernel from the plurality of browser kernels according to priority levels of the plurality of browser kernels.

15. The non-transitory computer-readable storage medium according to claim 10, the method further comprising:
establishing a mapping relationship between the web page address and the browser kernel corresponding to the matching web page element sample; and
adding the web page address as an address sample to the preset address sample set.

16. A web page access device, comprising:
a memory, the memory storing program instructions; and
one or more processors coupled to the memory and, when executing the program instructions, configured to perform:
obtaining a web page access request, the web page access request carrying a web page address;
determining whether a preset address sample set has an address sample matching the web page address, each address sample in the preset address sample set corresponding to one of multiple browser kernels;
according to a determining result, loading a web page corresponding to the web page address by using a first browser kernel, including:
upon determining that the preset address sample set has an address sample matching the web page address, using a browser kernel corresponding to the matching address sample as the first browser kernel; and upon determining that the preset address sample set does not include an address sample matching the web page address, using a default browser kernel as the first browser kernel;

detecting a web page element of the web page;

determining whether a preset element sample set has a web page element sample matching the web page element, each preset element sample set corresponding to one or more browser kernels of the multiple browser kernels; and when the preset element sample set has a web page element sample matching the web page element, determining whether browser kernel switching needs to be performed based on whether a target browser kernel corresponding to the matching webpage element is the same as the first browser kernel.

17. The web page access device according to claim 16, wherein the processor is further configured for:

when it is determined that browser kernel switching needs to be performed, re-loading the web page by using the target browser kernel corresponding to the matching web page element sample.

18. The web page access device according to claim 16, wherein the processor is further configured for:

obtaining a plurality of browser kernels corresponding to the matching web page element sample; and selecting the target browser kernel from the plurality of browser kernels for determining whether browser kernel switching needs to be performed.

19. The web page access device according to claim 18, wherein, for determining whether browser kernel switching needs to be performed, the processor is further configured for:

when it is determined that the target browser kernel is not same as the browser kernel, determining that browser kernel switching needs to be performed, wherein, for performing browser kernel switching, the processor is further configured for: re-loading the web page by using the target browser kernel.

\* \* \* \* \*